US008953854B2

(12) United States Patent
Kumar et al.

(10) Patent No.: US 8,953,854 B2
(45) Date of Patent: Feb. 10, 2015

(54) CONTACTLESS 3D BIOMETRIC FEATURE IDENTIFICATION SYSTEM AND METHOD THEREOF

(71) Applicant: The Hong Kong Polytechnic University, Kowloon (HK)

(72) Inventors: Ajay Kumar, Kowloon (HK); Cyril Kwong, Kowloon (HK)

(73) Assignee: The Hong Kong Polytechnic University, Hong Kong (CN)

( * ) Notice: Subject to any disclaimer, the term of this patent is extended or adjusted under 35 U.S.C. 154(b) by 0 days.

(21) Appl. No.: 13/935,584

(22) Filed: Jul. 5, 2013

(65) Prior Publication Data

US 2014/0044322 A1 Feb. 13, 2014

Related U.S. Application Data

(60) Provisional application No. 61/680,716, filed on Aug. 8, 2012.

(51) Int. Cl.
*G06K 9/00* (2006.01)

(52) U.S. Cl.
CPC .............. *G06K 9/00087* (2013.01); *G06K 9/00* (2013.01)
USPC .......................................... 382/124; 382/285

(58) Field of Classification Search
CPC ............ G06K 9/0002; G06K 9/00026; G06K 9/00067; G06K 9/00087
USPC .................................. 382/115, 116, 124, 154
See application file for complete search history.

(56) References Cited

U.S. PATENT DOCUMENTS

| 6,404,904 | B1 | 6/2002 | Einighammer et al. | |
| 6,961,451 | B2 * | 11/2005 | Funada | 382/124 |
| 7,110,581 | B2 * | 9/2006 | Xia et al. | 382/124 |
| 7,349,560 | B2 * | 3/2008 | Miyazaki | 382/124 |
| 7,609,865 | B2 | 10/2009 | Chen | |
| 7,711,158 | B2 * | 5/2010 | Ahn et al. | 382/124 |
| 7,747,044 | B2 * | 6/2010 | Baker et al. | 382/116 |
| 7,773,784 | B2 * | 8/2010 | Boult | 382/124 |

(Continued)

OTHER PUBLICATIONS

Kanhangad, V., et al., "Contactless and pose invariant biometric identification using hand surface," IEEE Transactions on Image Processing, vol. 20, No. 5, pp. 1415-1424, May 2011.*

(Continued)

*Primary Examiner* — Vikkram Bali
*Assistant Examiner* — Xuemei Chen
(74) *Attorney, Agent, or Firm* — Eagles IP Limited; Jacqueline C. Lui (57) ABSTRACT

The present invention discloses a contactless 3D biometric feature identification system and the method thereof. The system comprises of a fixed-viewpoint image capturing means, a lighting module capable of producing different illuminations on the object of interest and a microprocessor configured to execute a biometric identification algorithm. The algorithm starts with capturing a plurality of images with different illuminations. The captured images are then utilized to reconstruct a three dimensional surface model. Different features, for instance 2D and 3D coordinates and orientations of the biometric feature, surface curvature of the object and the local surface orientation of the object, are extracted from the captured images and the reconstructed 3D surface model. Different matching scores are also developed based on the aforesaid features to establish the identity of the biometric features.

18 Claims, 10 Drawing Sheets

(56) References Cited

U.S. PATENT DOCUMENTS

| | | | | |
|---|---|---|---|---|
| 8,135,181 | B2* | 3/2012 | Zhang et al. | 382/115 |
| 8,391,590 | B2* | 3/2013 | Yalla et al. | 382/154 |
| 2005/0226474 | A1 | 10/2005 | Merbach et al. | |
| 2006/0120576 | A1 | 6/2006 | Chen | |
| 2008/0101664 | A1 | 5/2008 | Perez | |

OTHER PUBLICATIONS

Tabassi, E., et al., "Fingerprint image quality," NIST, Aug. 2004.*
Kumar, A., et al., "Human identification using finger images," IEEE Transactions on Image Processing, vol. 21, No. 4, Apr. 2012.*
G. Parziale and Y. Chen, Chapter 4: Advanced Technologies for Touchless Fingerprint Recognition, Handbook of Remote Biometrics, Advances in Pattern Recognition, 2009, pp. 83-109, Springer-Verlag, London.
Yongchang Wang et al., Data Acquisition and Quality Analysis of 3-Dimensional Fingerprints, IEEE conference on Biometrics, Identity and Security, Sep. 22-24, 2009, Tampa, Florida.
Yeegahng Song et al., A New Scheme for Touchless Fingerprint Recognition System, Proceedings of the 2004 International Symposium on Intelligent Signal Processing and Communication Systems, 2004, pp. 524-527.
Geppy Parziale et al., The Surround Imager™: A Multi-camera Touchless Device to Acquire 3D Rolled-Equivalent Fingerprints, Proceeding of International Conference on Biometrics (ICB), 2006, pp. 244-250, Hong Kong.
Yongchang Wang et al., Fit-sphere Unwrapping and Performance Analysis of 3D Fingerprints, Applied Optics, Feb. 1, 2010, pp. 592-600, vol. 49, No. 4.
Gerhard Paar et al., Photogrammetric Fingerprint Unwrapping, Journal of Applied Geodesy, 2008, pp. 13-20, vol. 2.
Robert T. Frankot et al., A Method for Enforcing Integrability in Shape from Shading Algorithms, IEEE Transactions on Pattern Analysis and Machine Intelligence, Jul. 1998, pp. 439-451, vol. 10, No. 4.
Vivek Kanhangad et al., A Unified Framework for Contactless Hand Verification, IEEE Transactions on Information Forensics and Security, Sep. 2011, pp. 1014-1027, vol. 6, No. 3.
Geppy Parziale et al., The Surround Imager™: A Multi-camera Touchless Device to Acquire 3D Rolled-Equivalent Fingerprints, Proc. IAPR Int. Conf. on Biometrics, Jan. 2006, pp. 244-250, LNCS 3832, ICB 2006.
Chitra Dorai et al., COSMOS—A Representation Scheme for 3D Free-Form Objects, IEEE Transactions on Pattern Analysis and Machine Intelligence, Oct. 1997, pp. 1115-1130, vol. 19, No. 10.
Jack Goldfeather et al., A Novel Cubic-Order Algorithm for Approximating Principal Direction Vectors, ACM Transactions on Graphics, Jan. 2004, pp. 45-63, vol. 23, No. 1.
Amit Agrawal et al., What Is the Range of Surface Reconstructions from a Gradient Field?, Proc. of the 9th European conference on Computer Vision—vol. Part I, May 2006, pp. 578-591, Graz, Austria.
Nicholas A. Vandi et al., CUDA Accelerated Iris Template Matching on Graphics Processing Units (GPUs), Biometrics: Theory Applications and Systems (BTAS), 2010 Fourth IEEE International Conference, Sep. 2010, pp. 1-7.
Bang-Hwan Kim et al., Multi-Image Photometric Stereo Using Surface Approximation by Legendre Polynomials, Pattern Recognition, 1998, pp. 1033-1047, vol. 31, No. 8.
Bang-Hwan Kim et al., Shape from Shading and Photometric Stereo Using Surface Approximation by Legendre Polynomials, Computer Vision and Image Understanding, Jun. 1997, pp. 255-270, vol. 66, No. 3.
Ajay Kumar et al., Towards Contactless, Low-Cost and Accurate 3D Fingerprint Identification, Proc. CVPR, 2013 pp. 3438-3443.
Robert K. Rowe et al., Multispectral Fingerprint Image Acquisition, Advances in Biometrics, Springer, 2008.
TBS, http://www.tbsinc.com, accessed on Aug. 2012.
Fast, non-contact 3D scanner, http://www.flashscan3d.com/, Aug. 24, 2013.
Wuyuan Xie et al., Incorporating Hanrahan-Krueger Model in Photometric Stereo for the 3D Reconstruction of Fingerprints, Proc. 3rd ICMV 2010, Dec. 28-30, 2010, Hong Kong, China.
Prof Chung Chi Kit Ronald and Dr. Song Zhan, Fast 3D Fingerprint Acquisition System (http://appsvr.cintec.cuhk.edu.hk/exhibition/project.php?pid=221), accessed on Feb. 25, 2013.

* cited by examiner

CONTACTLESS 3D BIOMETRIC FEATURE IDENTIFICATION SYSTEM AND METHOD THEREOF

CROSS-REFERENCE TO RELATED APPLICATION

This application claims benefit under 35 U.S.C. §119(e) of U.S. Provisional Application having Ser. No. 61/680,716 filed 8 Aug. 2012, which is hereby incorporated by reference herein in its entirety.

FIELD OF INVENTION

This invention relates to a contactless three dimensional (3D) biometric feature identification system and the method thereof, in particular the present invention is used to identify fingerprint.

BACKGROUND OF INVENTION

Biometrics based human identification is one of the most critical and challenging task to meet growing demand for stringent security. Among different biometric features, fingerprint-based biometric is the most proven technique and has the largest market shares. Although fingerprint recognition has been studied for many years and much progress has been made, even the performance of state-of-the-art fingerprint matchers is still much lower than the expectations of people and theory estimation. The reason is that the traditional fingerprint acquisition is conducted by pressing or rolling of fingers against the hard surface (glass, silicon, polymer) or paper which often results in partial or degraded images due to improper finger placement, skin deformation, slippages, smearing or due to sensor noise. Therefore contactless finger imaging systems that can provide three dimensional (3D) representation of fingerprints have recently emerged to provide ideal solutions to above intrinsic problems. Such 3D approaches can provide more accurate personal identification due to the large amount of information contained in the 3D surface models as compared to the traditional two dimensional (2D) fingerprint images. The main obstacle of these emerging 3D fingerprint technologies to replace the conventional 2D fingerprint system lies in their bulk and high cost, which mainly results from the usage of structured lighting system or multiple cameras.

Besides, both of these technologies have not been able to exploit other surface parameters, like surface normal vectors, refraction parameters, and scattering parameters etc., which can also contribute to the precision of the reconstruction result. Therefore advanced capability to develop more and low-cost solution for the 3D fingerprint identification will significantly enhance the applicability of fingerprint recognition technologies in wide range of civilian and commercial applications.

SUMMARY OF INVENTION

In the light of the foregoing background, it is an object of the present invention to provide an alternative design of contactless 3D biometric feature identification system and the method thereof.

Accordingly, the present invention, in one aspect, is a method of identifying biometric feature comprising the steps of capturing a plurality of images with different illuminations of an object that has such biometric features; reconstructing a 3D surface model of the object based on the captured images and extracting a plurality of features from the plurality of images and the 3D surface model. The aforesaid plurality of features comprises 3D coordinates and orientations of the biometric features In one embodiment of the present invention, the plurality of features further comprises surface curvature and local surface orientations of the object and 2D coordinated and orientation of the biometric features.

In another embodiment, the step of extracting the plurality of features further comprises the steps of extracting 2D coordinates and orientations of the features from each of the captured images; evaluating the reliability of the features accordingly; and extracting 3D coordinates and orientations of the features based on the reliability.

In a further embodiment, the step of establishing identity further comprises the steps of computing a plurality of parameters based on the plurality of features and corresponding predefined reference features of a second object; generating matching scores based on the plurality of parameters; and establishing identity of the biometric feature based on the matching score. In one embodiment, a combined matching score which is a weighted sum of said matching scores. In another embodiment, the combined matching score is a dynamic combination of said matching scores.

According to another aspect of the present invention, a biometric feature identification system is disclosed. The system comprises a lighting module configured produce a plurality of illuminations on the object having the biometric features; a fix-viewpoint image capturing means configured to capture images of an object having the biometric features; a microprocessor coupled to the image capturing means and the lighting module; and a computer-readable storage medium coupled to the microprocessor. The computer-readable storage medium is encoded with computer-readable instructions for causing the microprocessor to execute the following steps: synchronizing the image capturing means and the lighting module; capturing a plurality of images of the object with each image having different illuminations; reconstructing a 3D surface model of the object based on the plurality of images; extracting a plurality of features from the plurality of images and the 3D surface model; and establishing identity of the object accordingly.

In one embodiment, the plurality of features comprises 2D and 3D coordinates and orientation of the biometric features; as well as surface curvature and local surface orientations of the object.

In one embodiment of the present invention, the lighting module comprises a plurality of light sources positioned around the image capturing means which can be switched on and off independently by the microprocessor thereby producing different illuminations on the object.

In another embodiment of the present invention, the lighting module comprises a modulated light source wherein the output intensity is controllable by the microprocessor thereby producing different illuminations on the object.

There are many advantages to the present invention. Firstly, this invention can be used in a variety of biometric identification applications, including fingerprint identification. The present invention utilizes a single camera with fixed viewpoint that simultaneously acquires and processes multiple 2D fingerprint images under different illuminations, thus reducing system cost substantially. Such photometric stereo inspired approach provides a low-cost alternative to the currently available 3D fingerprint recognition systems which either use structured lighting or multiple cameras.

Another advantage of the present invention is that the accuracy of fingerprint recognition is higher than conventional fingerprint systems in both verification and recognition applications. This improvement is due to the 3D feature extraction algorithm as proposed in the present invention which is able to recover additional fingerprint features and adaptively match them.

BRIEF DESCRIPTION OF FIGURES

FIG. 9b shows the false positive identification rate (FPIR) vs. false negative identification rate (FNIR) characteristics from the same experiment as in FIG. 9a.

DETAILED DESCRIPTION OF THE PREFERRED EMBODIMENTS

As used herein and in the claims, "comprising" means including the following elements but not excluding others.

Figure 1:
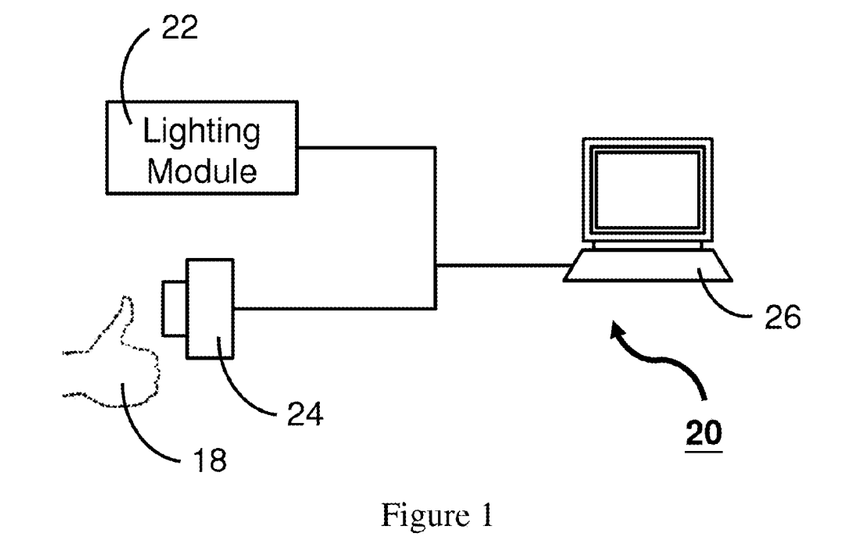
FIG. 1 is a schematic diagram of biometric feature identification system according to one of the embodiment of the present invention.

Referring now to FIG. 1, the first aspect of the present invention is a biometric feature identification system 20 comprising a lighting module 22, an image capturing means 24 and a microcomputer 26. The microcomputer 26 at least comprises a microprocessor (not shown) and a computer-readable storage medium or memory (not shown) connected to the microprocessor. The lighting module 22 and image capturing means 24 are further coupled to the microprocessor.

The lighting module 22 is configured to produce a plurality of illuminations on an object having the biometric features and the image capturing means 24 is configured to capture a plurality of images of the object 18 having the biometric features of interest. During operation, the object 18 has no physical contact with the biometric feature identification system 20. In one embodiment, the object 18 is placed in front of, without any physical contact with, the image capturing means 24 as shown in FIG. 1. As shown in this figure, the object 18 is a finger and the biometric features are the fingerprint.

Figure 2:
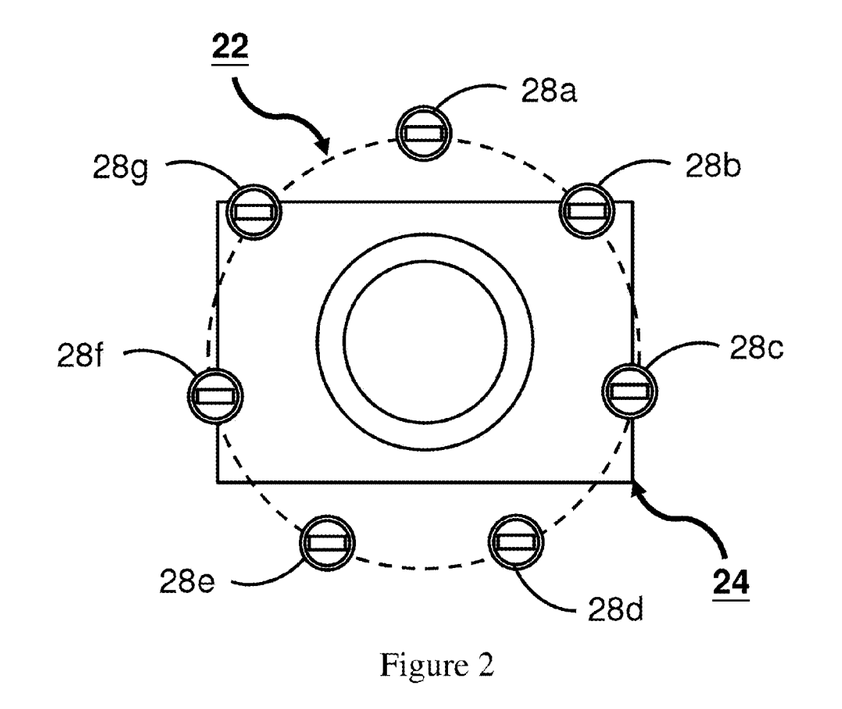
FIG. 2 is the front view of the image capturing means and the lighting module according to one of the embodiments of the present invention.

Referring now to FIG. 2, in one embodiment of the present invention, the lighting module 22 comprises of a plurality of light-emitting diodes 28a-28g (LEDs). The LEDs 28a-28g are positioned around the image capturing means 24 and are distributed evenly around the center of the image capturing means 24. The LEDs 28a-28g are configured to be switched on or off independently by the microprocessor thereby the object can be illuminated from different illuminating angles. The microprocessor is further configured to synchronize the lighting module 22 and image capturing means 24 such that a plurality images can be captured with each of the images having different illuminations on the same object. In another embodiment, the illumination sources that emit different colored light can be employed to simultaneously estimate the shading corresponding to each color source by separating the color/spectral image components of acquired/multispectral image(s). In another embodiment, the plurality of LEDs can be replaced by a single modulated light source and different illuminations are produced on the object by alternating the output intensity of the modulated light source.

Figure 3:
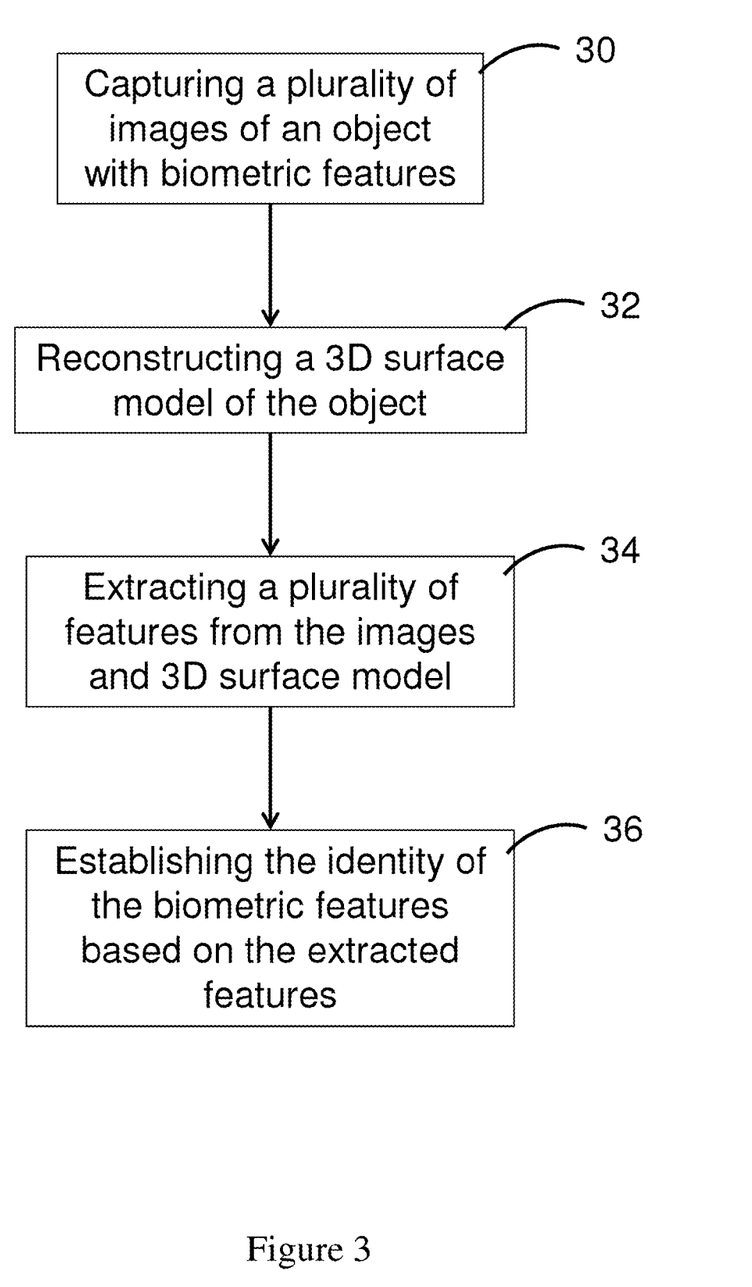
FIG. 3 shows the concept flow chart of the method of identifying biometric feature according to one of the embodiments of the present invention.

According to another aspect of the present invention, now referring to FIG. 3, a method of identifying biometric feature is provided. After capturing a plurality of images of the object in step 30, a 3D surface model of the object is reconstructed in step 32. Afterwards a plurality of features is extracted from the images and 3D surface model in step 34 which in turns are used in establishing the identity of the biometric features (step 36).

The reconstruction step 32 is based on the shape from shading technique. Given a captured image E(x, y), the shape from shading technique can be used to recover the surface model z(x, y) using the following equation (1):

$$E(x,y) = \rho I_0 R(p(x,y), q(x,y)) \qquad (1)$$

where $\rho$ is the albedo and $I_0$ is the incident radiance. The surface reflectance R relates the observed image pixel intensities in E(x, y) to the surface orientations/gradients for a given source direction and the surface reflectance in the direction of the image capturing means. The surface gradients p(x, y) and q(x, y) can be defined as following equation (2):

$$p(x,y) = \partial f(x,y)/\partial x, \; q(x,y) = \partial f(x,y)/\partial y \qquad (2)$$

The 3D surface model can be reconstructed by recovering the surface height information z=f(x, y). In one embodiment, the surface of the object is assumed to be a Lambertian surface which is illuminated by a plurality of, say m, light sources, i.e., $L = [l^1, l^2, \ldots l^m]^T$. Each of these light sources is fixed with known direction $l = [l_x, l_y, l_z]^T$ and radiance $\|l\|$. Let $n = [n_x, n_y, n_z]^T$ be the unit surface normal vectors at some point of interest on the surface model. The observed image pixel intensities y, from the m images, corresponding to the respective illumination sources can be written as following equation (3):

$$y = L \cdot x \qquad (3)$$

where $L=[y_1, y_2, \ldots y_m]^T$ and $x=\rho[n_x,n_y,n_z]^T$. In one embodiment, the light source directions are not co-planer so that the matrix L is non-singular. Equation (3) illustrates linear relationship between the 3D surface model, observed pixel intensities from the captured images and the unit surface normal vectors x. The unknown vector x can be estimated from the least squared error technique using the following equation (4):

$$x=(L^T L)^{-1} L^T y = \rho n \quad (4)$$

Since n is of unit length, the length of recovered vector x is the absolute reflectance (albedo) $\rho$ and the surface normal is represented by the direction of unit vector n. The recovered surface normals are then integrated to recover the 3D object surface $z(x, y)$.

In one embodiment, the method of identifying biometric feature further comprises a step of preprocessing the 3D surface model $z(x, y)$. The 3D surface model is first smoothed using a median filer, followed by a 3D variant of Laplacian smoothing which can effectively denoises point clouds. For a vertex $z_i$ within the image $z=f(x, y)$, with its neighbors $z_j$, the updated vertexes $\bar{z}_i$ are computed by the following equation (5):

$$\bar{z}_i = (1-\epsilon)z_i + \frac{\epsilon}{\sum_j w_{ij}} \sum_j w_{ij} z_j \quad (5)$$

where $w_{ij}$ is a finite support weighting function and is chosen as the inverse of distance between vertex $z_i$ and its neighbors $z_j$, i.e. $w_{ij}=\|z_j-z_i\|^{-1}$. The reconstructed surface model is smoothed after 40 iterations with $\epsilon=0.5$ and the neighbors j are chosen within ±2 pixel in the x and y directions from vertex $z_i$. The normal vectors of the cloud point data for the smoothed surface is then computed by the gradient of $z=f(x, y)$. The normalized vector is an upward normal with $(-g_x, -g_y, 1)$, where $g_x$ and $g_y$ are the gradient along x and y directions. The normalized surface normal is then used for estimating the principle curvature.

After reconstructing the 3D surface model in step 32, a plurality of features is extracted from the 3D surface model and the plurality of images in step 34. In one embodiment, the features comprise 3D coordinates and orientations of the biometric features. In another embodiment of the present invention, the features further comprise surface curvature and local surface orientation of the object. In order to prevent object movement between each captured image from affecting the accuracy and reliability of the extracted features, in one embodiment, the 3D coordinates and orientations are extracted base on the result of a reliability test applied on the plurality of images.

To illustrate the feature extraction algorithm of the present invention, a specific realization on applying these extraction algorithms to identifying the fingerprint is disclosed herein. In the context of fingerprint identification, the aforesaid object is a finger and the biometric feature is the fingerprint itself. In one embodiment, the step of extraction 34 starts with extracting 2D coordinates and orientations of the features (2D minutiae). 2D minutiae details $(x, y, \theta, q)$ consisting of position of the minutiae $(x, y)$, angle $\theta$ representing the orientation of the minutiae and the quality q of the minutiae.

In one embodiment, the reliabilities of the extracted 2D minutiae are then evaluated. The rationale behind the reliability test is that if a particular minutiae is detected in more than one image among the plurality of images acquired, that particular minutiae is considered to be reliable. One particular implementation of the reliability test is disclosed as follows:

Let the list of minutiae extracted from the plurality of fingerprint image under the first illumination angle be $L=\{m_1, m_2 \ldots m_n\}$, where $m=[x, y, \theta, q]$. Then the counted list $CL=\{cm_1, cm_2, \ldots, cm_n\}$ is initialized, where $cm=[x, y, \theta, q, c]$, and c is the number of occurrences and is set to 1. For each minutiae $m_i$ from the fingerprint image under the second to seventh illumination angle, the CL is updated as follows:

Let $\{TL\}$ be a subset of CL such that such that $\|x_{cm_k}-x_i, y_{cm_k}-y_i\|^2 \leq k_1$ and $\min(|\theta_{cm_k}-\theta_i|, 360-|\theta_{cm_k}-\theta_i|) \leq k_2$, where $cm_k \in CL$, then $cm_t$ is updated such that $c_t \geq c_i$ for all $cm_i \in \{TL\}$. The value of x, y, $\theta$, q of updated $cm_t$ will be the average value of existing cluster members and the new member, and c will be increased by one. If $\{TL\}=\emptyset$, then $CL=CL \cup [x_i,y_i,\theta_i,q_i,1]$. In one embodiment of the present invention, the constant $k_1$ is set to 4 since the minutiae location in differently illuminated fingerprint images would not shift too far away and square root of 4, i.e. 2, which is slightly smaller the half width of the ridge (measured as 5 pixels in experiments). In another embodiment, constant $k_2$ is set to 25 for the acceptable angle difference which can keep the cluster to have similar direction/orientation. After updating CL, the subset of CL is picked as DL with $c \geq 2$. If two clusters groups are too close, they are merged to one single group to reduce the chance that a single minutia is extracted as two minutiae. The final list of minutia, which is the merged list DL, is considered to have high reliability.

In one embodiment, the highly reliable 2D minutiae are extended to 3D coordinates and orientations (3D minutiae) by adding two additional features z and $\phi$ onto $(x, y, \theta, q)$. The value z is the height of the vertex on the reconstructed 3D surface model at position $(x, y)$ while $\theta$ and $\phi$ represent the minutiae orientation in spherical coordinates with unit length 1. The angle $\phi$ is computed by tracing the reconstructed 3D surface model at minutiae locations along the direction of $\theta$, which is available from 2D minutiae details $(x, y, \theta, q)$. In case of bifurcation type of minutiae, the local ridge surface is masked while local valley surface is masked for the end type of minutiae since the direction $\theta$ is here pointing in outward direction. The angle $\phi$ is then computed by estimating the principle axes of the masked ridge surface. Therefore, the minutiae representation can be extended in 3D space with the representation $(x, y, z, \theta, \phi, q)$.

In one embodiment, surface curvature and surface directions are also extracted as members of the plurality of features. The surface curvature typically measures local bending of fingerprint surface at each of the surface points while the surface directions indicate the directions of minimum and maximum surface bending. The surface curvature is estimated using local surface fitting (cubic order approximation). Let a given surface point be s with its normal N and its u neighboring points be t, with their normal vectors $K_i$ where $i=1, 2 \ldots u$. In the coordinate system with s as the origin (0, 0, 0) and its normal N as the z-axis, the position of neighbors $t_i$ is $(x_i, y_i, z_i)$ and the values of $K_i$ is $(a_i, b_i, c_i)$. Using the adjacent-normal cubic order algorithm, a surface that can fit the vertex and its neighboring points is located such that:

$$z = f(x, y) = \frac{a}{2}x^2 + bxy + \frac{c}{2}y^2 + dx^3 + ex^2y + fxy^2 + gy^3 \quad (6)$$

The normal vector of the surface point s in the approximated surface is written as $$N(x, y) = (f_x(x, y), f_y(x, y), -1) \quad (7)$$
$$= (ax + by + 3dx^2 + exy + fy^2, bx + cy + ex2 + 2fxy + 3gy^2, -1)$$

The cubic-order surface fitting, for both the neighboring surface points and their normal, generate following three equations for each of the surface points.

$$\begin{pmatrix} 0.5x_i^2 & x_iy_i & 0.5y_i^2 & x_i^3 & x_i^2y_i & x_iy_i^2 & y_i^3 \\ x_i & y_i & 0 & 3x_i^2 & 2x_iy_i & y_i^2 & 0 \\ 0 & x_i & y_i & 0 & x_i^2 & 2x_iy_i & 3y_i^2 \end{pmatrix} \Omega = \begin{pmatrix} z_i \\ -a_i/c_i \\ -b_i/c_i \end{pmatrix} \quad (8)$$

where $\Omega = [a\ b\ c\ d\ e\ f\ g]^T$ is the coefficient vector of cubic surface. Equation (7) represents an over determined equation system and can be written in the following form:

$$K\Omega = R \quad (9)$$

where K is 3u×7 matrix (from left hand side of equation 7) and R is 3u×1 vector. Least-square fitting is applied to find the best solution for equation (7) and construct Weingarten curvature matrix W for the fitted surface using only three coefficients.

$$W = \begin{pmatrix} a & b \\ b & c \end{pmatrix} \quad (10)$$

The eigenvalues of Weingarten matrix are the maximum and minimum principle curvature of the surface ($k_{max}$ and $k_{min}$), and their eigenvectors are the principal direction vectors ($t_{max}$ and $t_{min}$) which can be directly computed. Shape index of a surface at vertex s is adopted to quantify the local shape of the fingerprint surface. The curvature information described using $C_i(s)$ is independent of scale and can be computed using following equation (11):

$$C_i(s) = \frac{1}{2} - \left(\frac{1}{\pi}\right)\tan^{-1}\left(\frac{t_{max} + t_{min}}{t_{max} - t_{min}}\right) \quad (11)$$

The $C_i(s)$ maps all shapes in the interval [0,1]. In one embodiment, the shape of the surface is considered to be valley and ridge if $C_i(s)$ is close to 0.25 and 0.75 respectively. This binomial representation is referred as Surface Code. In another embodiment, the zone of surface is split into five zones: cup, rut, saddle, ridge and cap as shown in table 1.

TABLE 1

| | | | | Zones of Finger Surface code | | | | | | | | | |
|---|---|---|---|---|---|---|---|---|---|---|---|---|---|
| Shape index | 0-0.0625 | | 0.0625-0.4375 | | | | | 0.4375-0.5625 | | 0.5625-0.9375 | | | 0.9375-1 |
| Angle (π/6) | / | 0 | 1 | 2 | 3 | 4 | 5 | / | 0 | 1 | 2 | 3 | 4 | 5 | / |
| Code | 0 | 1 | 2 | 3 | 4 | 5 | 6 | 7 | 8 | 9 | 10 | 11 | 12 | 13 | 14 |

Direction of the dominant principle curvature ($\max(|k_{Max}|, |k_{Min}|)$) is portioned into six directions. Rut and ridge zones are further divided since cup, saddle and cap's $|k_{Max}|$ and $|k_{Min}|$ are close; therefore, $t_{max}$ and $t_{min}$ are not as accurate as that in rut and ridge zones. The resulting feature representation, referred to as Finger Surface Code has 15 different values and therefore 4-bits can store resulting binary code for each pixel.

In one embodiment, local surface orientation is also extracted from the reconstructed 3D surface model. The local surface orientation is extracted by exploiting the unit normal vector location at the 3D fingerprint surface points. The unit normal vector at 3D fingerprint surface point can be estimated using lowest eigenvalues which are available while determining principle axes of the masked ridge surface for the minutiae direction angle φ. Since the direction of principle axis is the normal vector over the masked ridge surface, it has least noise as compared to the case when the normal vector is measured on the exact minutiae location.

After extracting all or part of the features as mentioned above, the identity of the biometric features is established based on the extracted features. In one embodiment, step 36 of establishing the identity further comprises the steps of computing a plurality of parameters based on the extracted features and corresponding predefined reference values of a second object; generating a matching score based on the parameters; and establishing identity of the object based on the matching score. In one embodiment, reference values of the second object corresponds to the biometric features obtained using the same feature extraction process on that object and stored in a database.

In one embodiment, the matching score is computed merely based on the 2D minutiae, and is referred as 2D matching score. The extracted minutiae pairs from the query image (Q) and pre-obtained template image (P) are matched to generate a 2D fingerprint matching scores between two 2D fingerprint images. All minutiae are converted to spherical coordinate as [r, $A_s$, $A_\theta$, T] which center at the reference minutia and align the angle with $\theta_{ref}$.

$$r = \sqrt{(x-x_r)^2 + (y-y_r)^2} \quad (12)$$

$$A_s = \text{atan2}\left(\frac{y - y_r}{x - x_r}\right) - \theta_r \quad (13)$$

$$A_\theta = (\theta - \theta_r) \quad (14)$$

where r is the distance of respective minutiae with the reference minutia, $A_s$ is the angular separation of the minutia and $A_\theta$ is the orientation of the minutia. If the difference between [$r_i$, $A_{si}$, $A_{\theta i}$, $T_i$] in P and [$r_j$, $A_{sj}$, $A_{\theta j}$, $T_j$] in Q is smaller than a predetermined threshold, then $T_i = T_j$, and the minutia i in P and minutia j in Q are considered as matched pair. The overall 2D matching score $S_{2D}$ is generated using the equation (15):

$$S_{2D} = \frac{m^2}{M_P M_Q} \quad (15)$$

where m is the total number of matched minutiae pairs and $M_P$, $M_Q$ is the number of minutiae in query and template image respectively. The maximum score from all of the possible reference minutia pair is selected as the final 2D matching score between fingerprint image P and Q.

Figure 4:
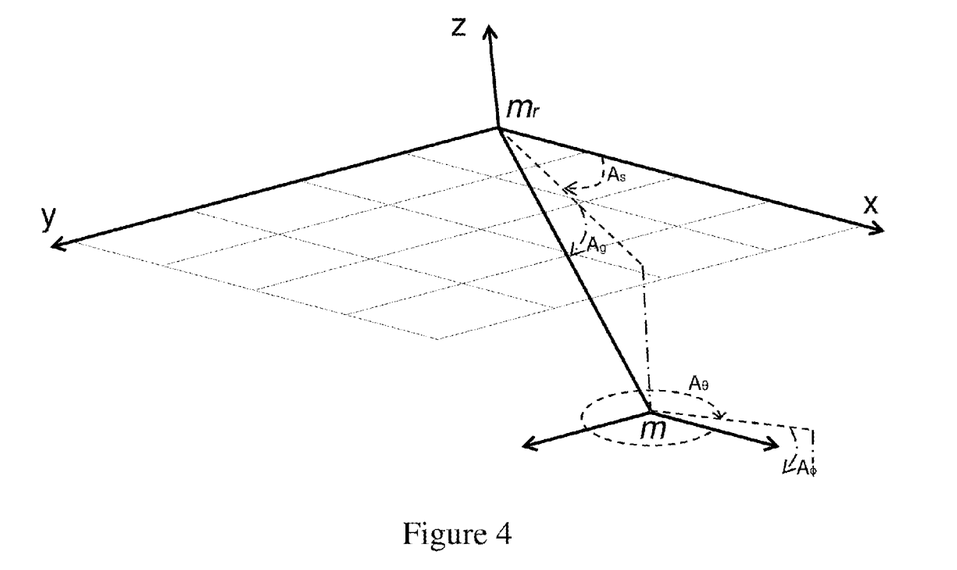
FIG. 4 shows the relative localization of a 3D minutia (m) with a reference minutia ($m_r$).

In another embodiment, the matching score is computed merely based on the 3D minutiae, and is referred as 3D matching score. Similar to the 2D minutiae matching score, a minutiae pair from the query image (Q) and pre-obtained template image (P) is first selected and all minutiae are converted to spherical coordinate. The minutiae pair are then aligned with the x-axes and z-axes. This alignment ensures that the aligned minutiae (in both P and Q) location can serve as the universal origin or reference minutiae to measure other minutiae in respective templates. An aligned minutia represented as $m_r = [x_r, y_r, z_r, \theta_r, \phi_r]$ in template P, the relative representation of other 3D minutiae in template P can be denoted as $m = [r, A_s, A_\theta, A_g, A_\phi]$. Referring to FIG. 4, r is the radial distance with reference minutiae, $A_\theta$, is the azimuth angle and $A_\phi$ is the elevation angle that localize the minutiae m in 3D plane, while $A_s$ and $A_g$ are the azimuth and the elevation angle that localize the radial vector r (with respect to reference minutiae $m_r$) in 3D space. Let $R_z(\theta)$ and $R_y(\phi)$ be the rotation matrix along z and y direction in Cartesian coordinate, and sph(x, y, z) be the Cartesian to Spherical coordinate transformation with unit length 1:

$$R_z(\theta) = \begin{bmatrix} \cos\theta & -\sin\theta & 0 \\ \sin\theta & \cos\theta & 0 \\ 0 & 0 & 1 \end{bmatrix}, R_y(\phi) = \begin{bmatrix} \cos\phi & 0 & -\sin\phi \\ 0 & 1 & 0 \\ \sin\phi & 0 & \cos\phi \end{bmatrix} \quad (16)$$

$$\text{sph}([xyz]) = [\text{atan } 2(y,x) \sin^{-1} z] \quad (17)$$

where atan 2 is the four-quadrant inverse tangent function. The parameters for the relative representation (feature vector) of minutiae m are computed as follows:

$$r = \sqrt{(x-x_r)^2 + (y-y_r)^2 + (z-z_r)^2} \quad (18)$$

$$[x' y' z'] = R_y(-\phi_r) R_z(-\phi_r) \frac{1}{r} [x - x_r, y - y_r, z - z_r]^T \quad (19)$$

$$[A_s A_g] = \text{sph}([x'y'z']) \quad (20)$$

$$[A_\theta A_\phi] = \text{sph}((R_y(-\phi_r) R_z(-\phi_r)(\text{sph}^{-1}([\theta \phi]))^T)^T) \quad (21)$$

Two 3D minutiae in the two fingerprint template P and Q are considered as matched pair if the difference between their feature vectors $$(r_{P_i}, A_{S_{P_i}}, A_{\theta_{P_i}}, A_{g_{P_i}}, A_{\phi_{P_i}})$$

and $$(r_{Q_i}, A_{S_{Q_i}}, A_{\theta_{Q_i}}, A_{g_{Q_i}}, A_{\phi_{Q_i}})$$

is smaller than a given threshold. The differences of each elements in the feature vector are computed as follows:

$$\Delta r = |r_{P_i} - r_{Q_i}| \quad (22)$$

$$\Delta A_S = \min(|A_{S_{P_i}} - A_{S_{Q_i}}|, 360° - |A_{S_{P_i}} - A_{S_{Q_i}}|) \quad (23)$$

$$\Delta A_\theta = \min(|A_{\theta_{P_i}} - A_{\theta_{Q_i}}|, 360° - |A_{\theta_{P_i}} - A_{\theta_{Q_i}}|) \quad (24)$$

$$\Delta A_g = |A_{g_{P_i}} - A_{g_{Q_i}}| \quad (25)$$

$$\Delta A_\phi = |A_{\phi_{P_i}} - A_{\phi_{Q_i}}| \quad (26)$$

In one embodiment of the present invention, the pair of minutia is considered as a match pair if all the difference vectors (22)-(26) are smaller than their corresponding predefined thresholds.

In another embodiment of the present invention, a unified 3D matching distance between two 3D minutiae is generated and rejects falsely matched minutiae using comparison with a predefined threshold. The function to combine the difference vector in equations (22)-(26) for generating unified matching distance can be written as follows equation (27):

$$\text{funRSG}(\Delta v) = \left(\frac{\Delta r}{65}\right)^{0.8} + \left(\frac{\Delta A_s}{30}\right)^{0.8} + \left(\frac{\Delta A_g}{15}\right)^{0.8} + \left(\frac{\Delta A_\theta}{18}\right)^{0.8} + \left(\frac{\Delta A_\phi}{42}\right)^{0.8} + \left(\frac{\Delta A_g}{15}\right)^{0.8} \left(\frac{1-\cos N}{0.075}\right)^{0.8} \quad (27)$$

where $\Delta v$ are the vector of difference of values as computed in (22)-(26). In one embodiment, the pair of minutia is considered as a matched pair if funRSG($\Delta v$) is smaller than 1.825.

In another embodiment, the equation (27) can be generalized and improved to take into the consideration of the non-linearity of the difference vector in equations (22)-(26) by adding the function of distance from reference minutiae to obtained equation (28):

$$\text{funRSG}(\Delta v) = \left(\frac{\Delta r}{f(r)}\right)^a + \left(\frac{\Delta A_s}{A}\right)^b + \left(\frac{\Delta A_g}{B}\right)^c + \left(\frac{\Delta A_\theta}{C}\right)^d + \left(\frac{\Delta A_\phi}{f(r)}\right)^{0.8} + \left(\frac{1-\cos N}{D}\right)^f \quad (28)$$

which has an independent set of power term {a, b, . . . , f} and f(r) is the function of distance. The pair of minutia is considered as a matched pair if funRSG($\Delta v$) is smaller than a predefined threshold.

The overall 3D matching score $S_{3D}$ between two 3D minutiae template P and Q is computed as follows:

$$S_{3D} = \frac{m^2}{M_p M_q} \quad (29)$$

where m is here refers to the total number of 3D matched minutiae pairs and $M_P$, $M_Q$ is the number of 3D minutiae in query and template image respectively.

In yet another embodiment, the matching score is computed merely based on the Finger Surface Codes. The Finger Surface Codes matching score $S_{Finger\ Surface\ Code}$ between a query Finger Surface Codes U from the query image and a reference Finger Surface Codes V from pre-obtained template image is computed using their normalized hamming distance as shown in equation (30):

$$S_{Finger\ Surface\ Code} = \frac{1}{4 \times U \times V} \sum_{p=1}^{U} \sum_{q=1}^{V} \otimes (J(p,q), K(p,q)) \quad (30)$$

where ⊗ denotes the Hamming distance between the two four bit Finger Surface Codes.

In another embodiment, the matching score is computed merely based on the local surface orientation (i.e. unit normal vector). The surface-orientation matching score $S_{orientation}$ between two unit normal vectors, say $n_p$ and $n_q$ from the minutiae of the query image (Q) and pre-obtained template image (P), is generated using their dot product, i.e., $S_{orientation} = \cos \alpha = n_p \cdot n_q$. If $S_{orientation}$ is bigger than a predefined threshold, the normal vectors of the two 3D fingerprints are considered to be matched.

In one embodiment, a combined matching score is computed and is used for minutiae matching. In a further embodiment, the combined matching score is a weighted sum of $S_{2D}$, $S_{3D}$, $S_{Finger\ Surface\ Codes}$ and $S_{orientation}$. In another embodiment, the combined matching score is a dynamic combination of $S_{2D}$, $S_{3D}$, $S_{orientation}$ and $S_{Finger\ Surface\ Codes}$.

Figure 5:
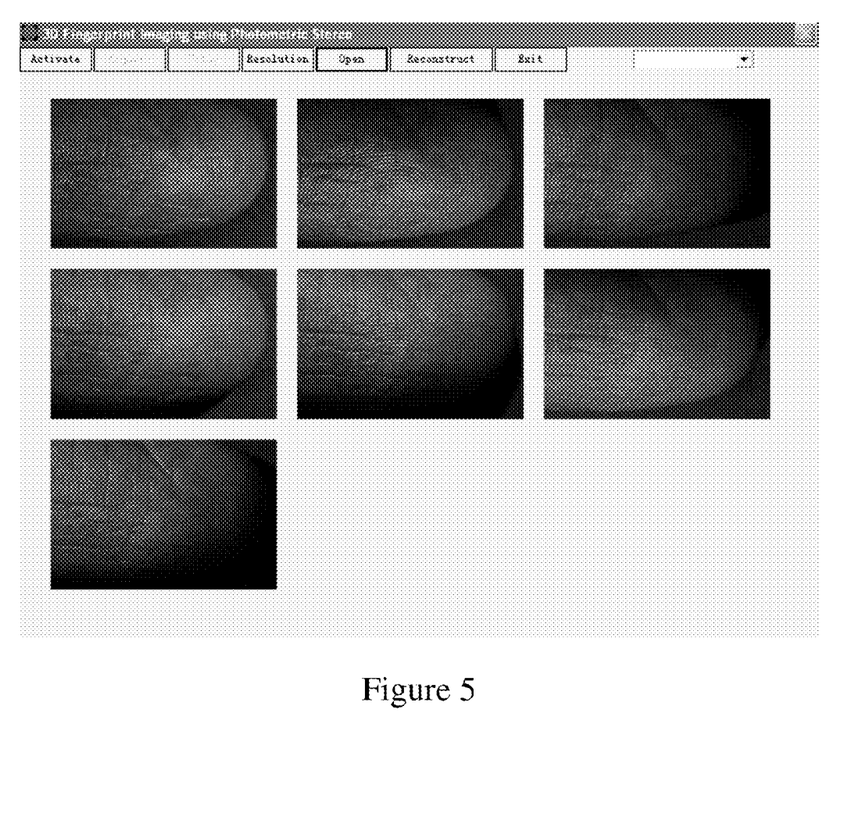
FIG. 5 shows a plurality of images captured by the biometric feature identification system according to one embodiment of the present invention.

In order to demonstrate the flexibility of the present invention, an experiment with real data is conducted. A 3D fingerprint database with 240 distinct fingers using the biometric feature system as proposed is first obtained. The light module comprises seven different LEDs which are able to generate seven different illuminations on the same finger and seven images (impressions) are acquired for each of the fingers as shown in FIG. 5.

Figure 6:
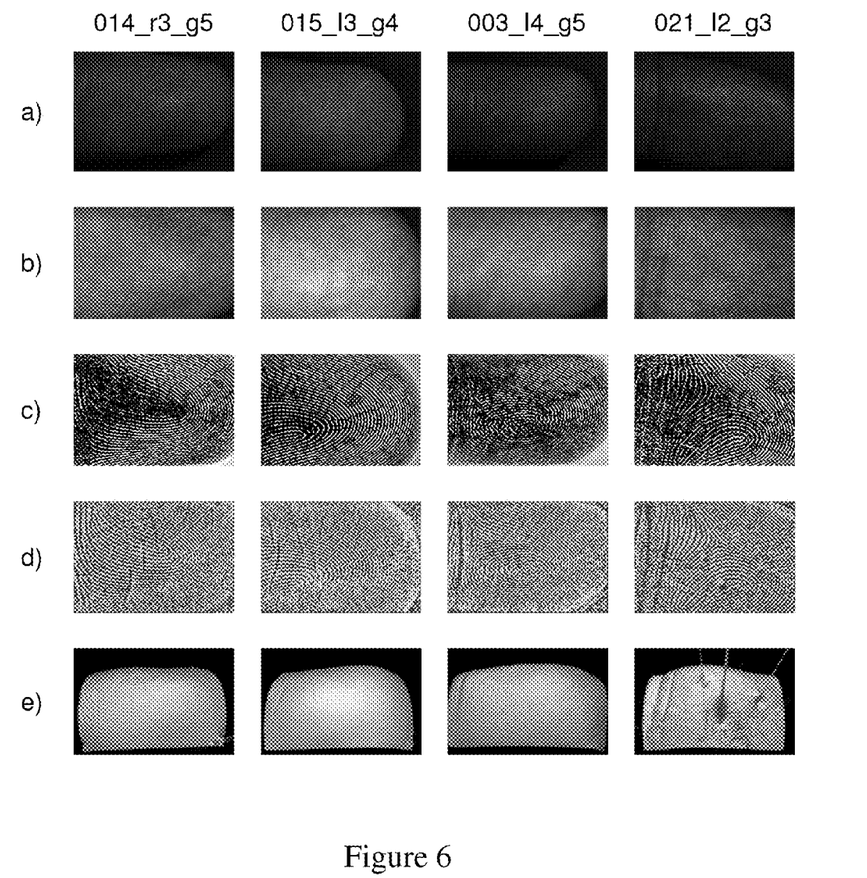
FIG. 6 shows four different series of 2D fingerprint images and the reconstructed 3D surface model, in particular (a) images as obtained by the image capturing mean according to one embodiment of the present invention; (b) images after normalization; (c) enhanced normalized images; (d) 3D curvature images of corresponding fingers and (e) reconstructed 3D surface model of the finger.

FIG. 6 illustrates image samples from four different fingers (014_r3_g5, 015_I3_g4, 003_I4_g5 and 021_I2_g3) and the intermediate results during preprocessing and 3D reconstruction. FIG. 6a shows one of the images captured by the image capturing means for each finger. FIGS. 6b and 6c illustrate the images after normalization and enhancement respectively. FIGS. 6d and 6e shows the surface curvature images and the reconstructed 3D surface model.

Figure 7:
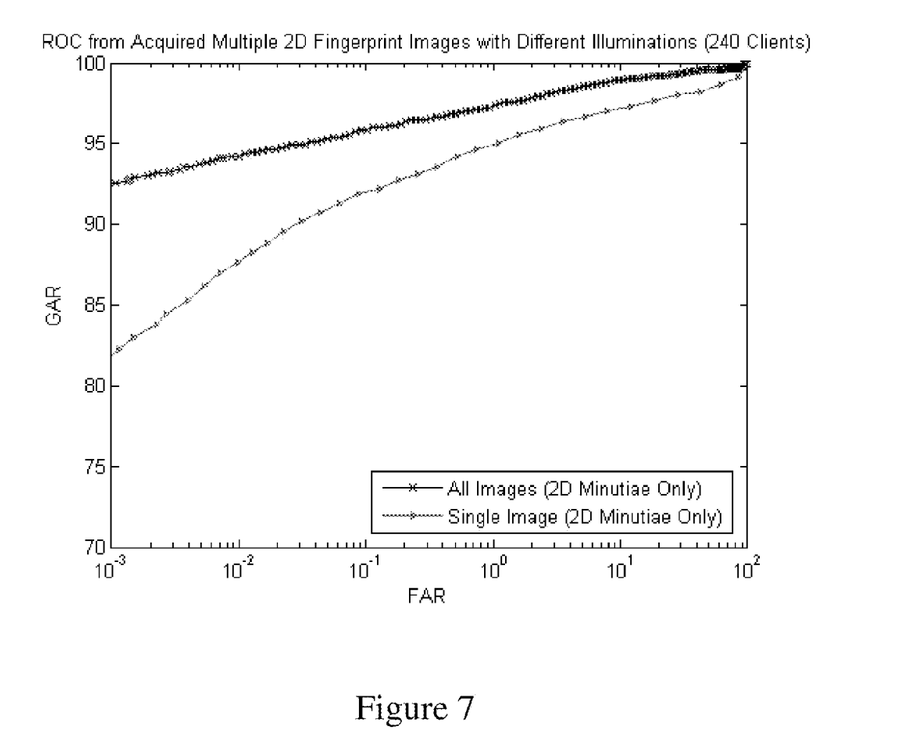
FIG. 7 shows the receiver operating characteristic (ROC) curves using 2D fingerprint images with different illuminations.

As mentioned, multiple 2D images acquired for the 3D fingerprint reconstruction can themselves be utilized for generating 2D matching scores based on the 2D minutiae. However the imaging procedure employed in the present invention requires that each of these images be acquired under different illumination. Therefore the 2D minutiae extracted from the respective images can be different and optimal matching scores are generated by matching all the available images from two fingers in template P and Q. FIG. 7 illustrates experimental results from the usage of all 2D fingerprint images when (i) the best possible matching scores among matching all seven images from each fingers are used and when (ii) only best performing one image was used. It should be noted that the 2D matching score generated using all respective 2D fingerprint images outperforms that utilizing only the best performing image.

Figure 8A:
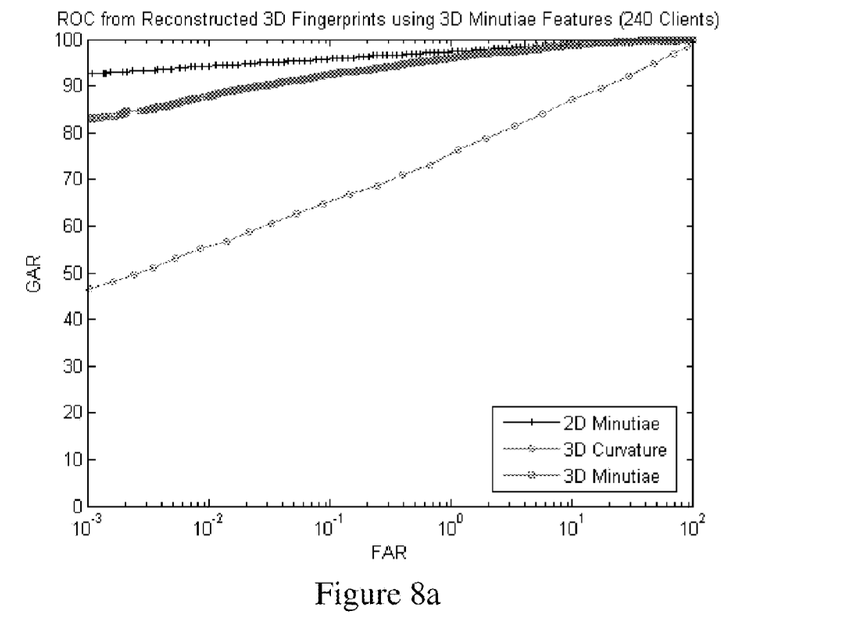
FIGS. 8a and 8b shows the ROC curve for the system performance using reconstructed 3D surface model and the system performance using combinations of 3D and 2D fingerprint images as acquired according to one embodiment of the present invention respectively.
Figure 8B:
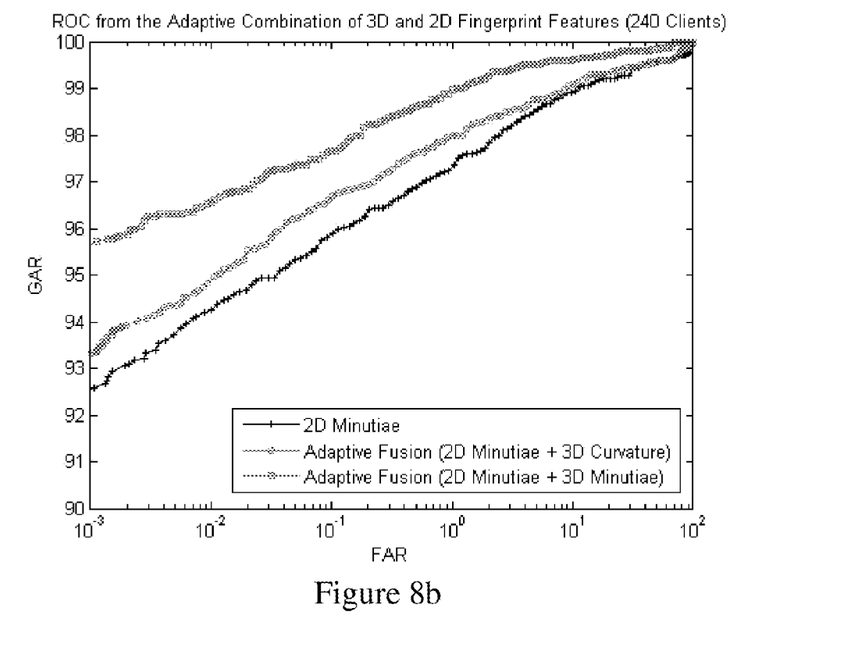

The performances of different fingerprint matching scores as proposed in the present invention are also studied. FIG. 8a illustrates matching results using 3D minutiae representation, 3D fingerprint curvature representation and also using 2D fingerprint images acquired for the 3D fingerprint reconstruction. It can be ascertained from this figure that 3D minutiae representation achieves superior results as compared to those using 3D fingerprint surface representation. FIG. 8b illustrates experimental results from the combination of 2D matching score (using the images acquired during 3D fingerprint reconstruction), 3D matching score, and 3D surface-orientation matching score. It can be ascertained from this figure that the combination of 3D minutiae matching scores with the available 2D minutiae matching scores achieves superior performance. This performance improvement is significant and suggests that 3D fingerprint information generated according to the present invention can be effectively used to improve performance for the contactless 2D fingerprint matching.

Figure 9A:
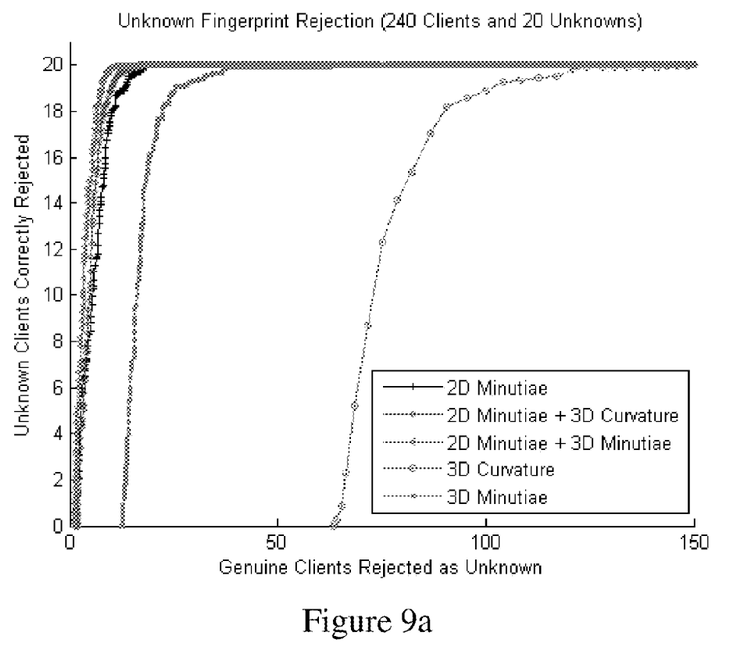
FIG. 9a shows the validation performance of the biometric features identification system according to the same embodiment of the present invention using 240 known clients and 20 unknowns.
Figure 9B:
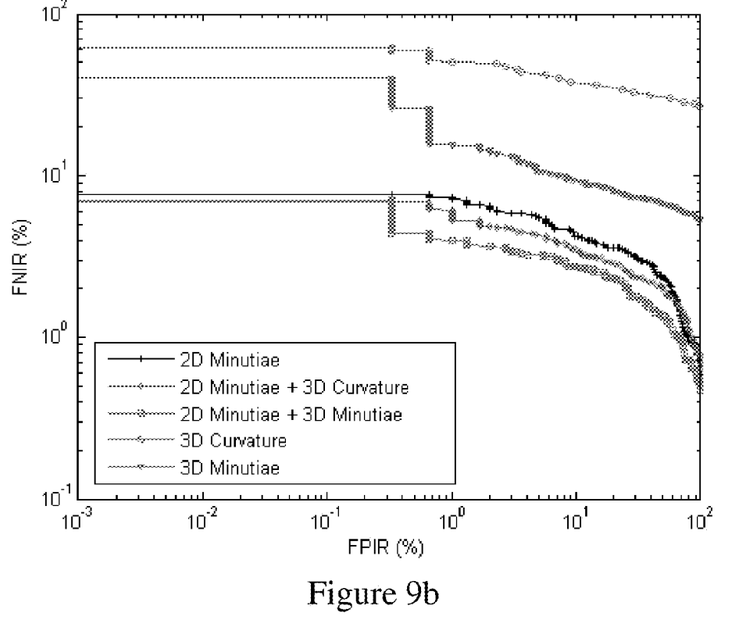

In order to ascertain the capability of the present invention to identify the unknown clients, 20 new finger images are acquired and are employed as unknown clients. These unknown clients were then identified from the proposed method to ascertain the performance. FIG. 9a shows the plot of number of unknown clients identified as unknown verses known clients rejected as unknown. These experimental results suggest superior performance from 3D minutiae representation and illustrate performance improvement with the combination of conventional 2D minutiae features. The performance from the proposed identification method for the FPIR and FNIR was also observed and is illustrated in FIG. 9b. The performance improvement using the combination of 3D minutiae representation, extracted from the reconstructed 3D fingerprint images, and 2D minutiae representation is observed to be quite consistent in FPIR vs. FNIR plots.

Figure 10A:
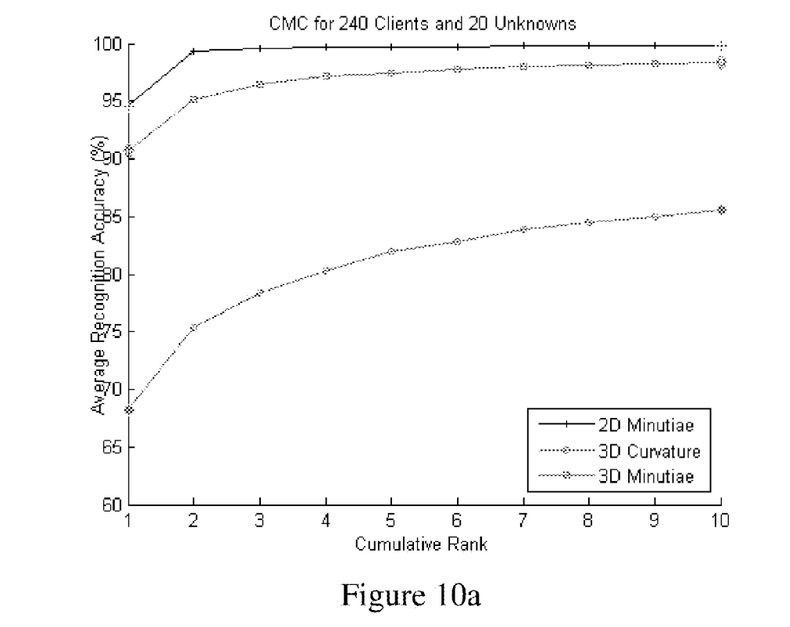
FIGS. 10a and 10b shows the cumulative match characteristics (CMC) for the average recognition performance on using reconstructed 3D surface model and respective performance using combination of 3D model and 2D fingerprint images according to the same embodiment of the present invention.
Figure 10B:
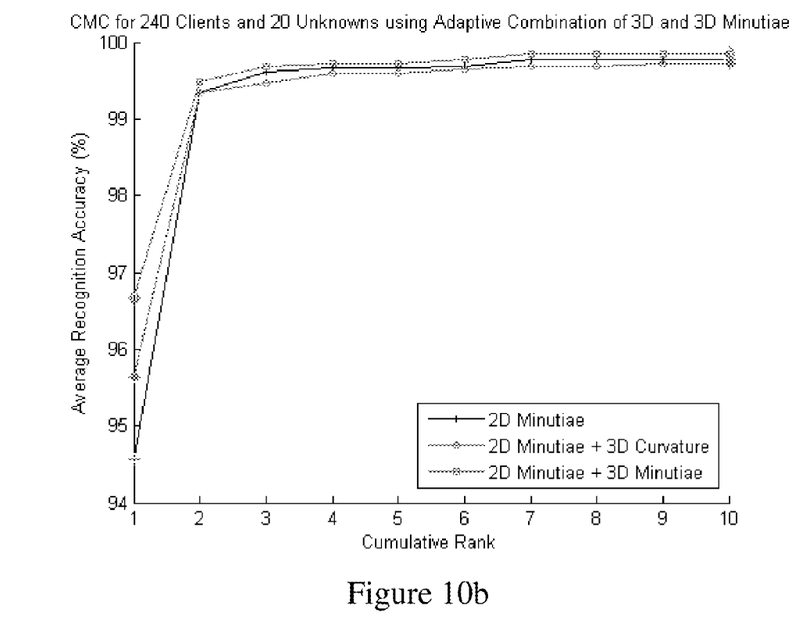
Figure 11A:
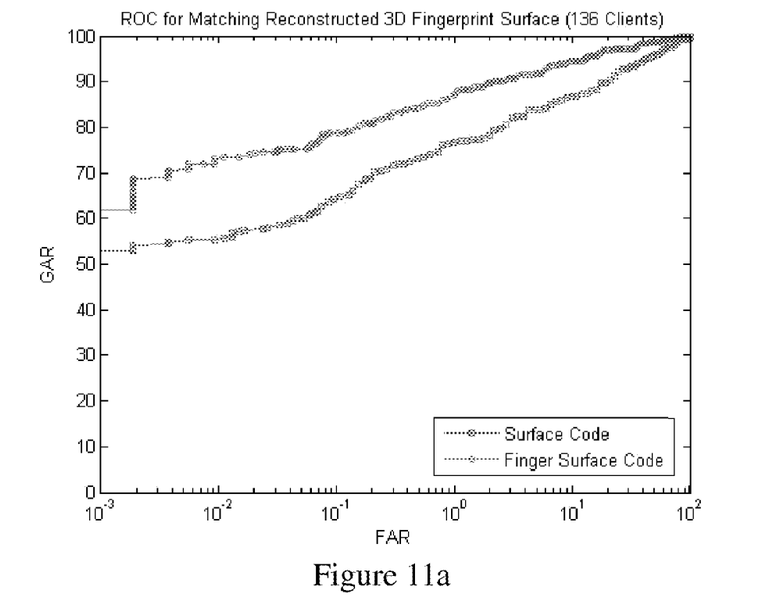
FIG. 11a and 11b shows ROC curve for the system performance using different surface code matching scores and respective performance using combination of different surface code and local surface orientation according to the same embodiment of the present invention.
Figure 11B:
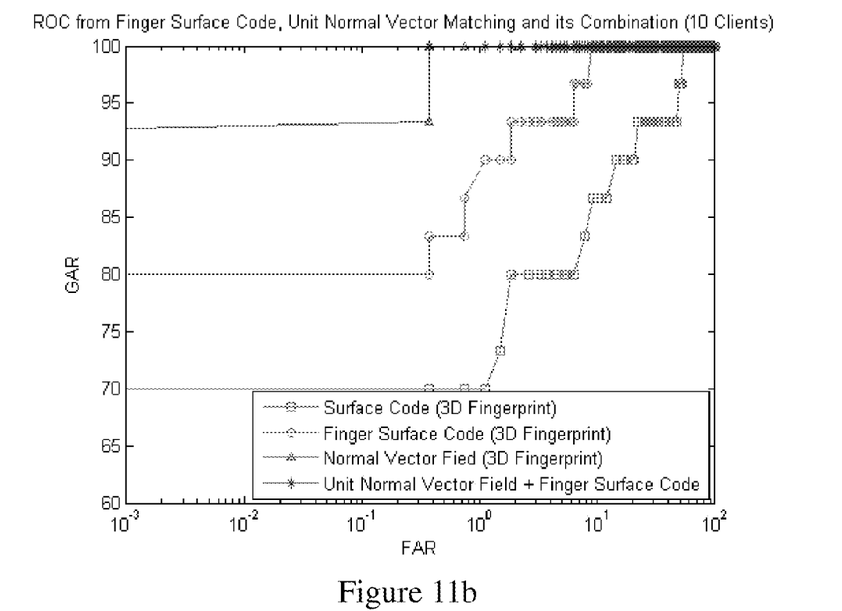

The present invention is also configured to perform recognition tasks of biometric features. FIGS. 10a and 10b illustrate the CMC from the recognition experiments for the comparison and combination of 2D/3D fingerprint features. These results also suggest superior performance using 3D minutiae representation, over 3D curvature representation, and also illustrate improvement in average (rank-one) recognition accuracy using the combination of available minutiae features from the 2D fingerprint images acquired during the 3D fingerprint reconstruction. The superiority of finger surface code, over the surface code, can be ascertained from the experimental results in FIG. 11a. Robust 3D fingerprint matching using the unit normal vector field matching and the significant performance improvement from the adaptive combination with finger surface code based 3D curvature matching can be ascertained from experimental results in FIG. 11b.

The overall quantitative performance comparison between conventional identification and different embodiments of the present invention is shown in the following table 2:

TABLE 2

| | Individual and combined match performance from 2D and 3D Fingerprint Images | | | | |
|---|---|---|---|---|---|
| Experiments | 2D Minutiae | 3D Curvature | 3D Minutia | 2D Minutiae + 3D Curvature | 2D Minutiae + 3D Minutiae |
| Equal Error Rate from 240 clients | 2.12% | 12.19% | 2.73% | 1.73% | 1.02% |
| Equal Error Rate from 240 clients and 20 unknowns | 5.44% | 32.26% | 9.28% | 4.36% | 3.33% |
| Rank-1 accuracy from 240 clients and 20 unknowns | 94.56% | 68.21% | 90.72% | 95.64% | 96.67% |

It should be ascertained from table 1 that the combination of 3D minutiae matching scores with 2D minutiae matching scores achieves the best performance. It suggests that the present invention provides a more accuracy fingerprint identification means comparing to the conventional fingerprint systems.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For instance, fingerprint identification is illustrated as a specific realization of the method as proposed in the present invention. However, it should be clear that the present invention can be applied to identification of any biometric features, for instance palm print, footprint, ear biometric and lip print.

Seven LEDs are used as the lighting module in the embodiment described above. It should be clear that any number of light sources may be used according to the user's preference. In another embodiment, any number of light sources with different color illuminations can be used, by separating the spectral component for respective light source in the acquired multispectral image, to simultaneously determine shading from each of the colored light source. Moreover, any types of light sources may also be used, such as light bulbs and fluorescent lamps, as long as they are able to illuminate the object with biometric feature from different illumination angles.

What is claimed is:

1. A method of identifying biometric features comprising the steps of:
    a) capturing a plurality of images of an object having said biometric features; wherein each of said images is captured with different illuminations;
    b) reconstructing a three dimensional surface model of said object based on all of said plurality of images captured in said capturing step;
    c) extracting a plurality of two dimensional minutiae of said biometric features from said plurality of images;
    d) evaluating a reliability of each of said two dimensional minutiae by determining a number of occurrence of each of said plurality of two dimensional minutiae throughout said plurality of images; and
    e) extracting a plurality of three dimensional minutiae of said biometric features from said three dimensional surface model at positions of said at least one reliable minutia, wherein said at least one reliable minutia is identified based on said reliability.

2. The method of claim 1, wherein said two dimensional minutiae comprise two dimensional coordinates and two dimensional orientations of said biometric features; wherein said three dimensional minutiae comprise three dimensional coordinates of said biometric features; and surface curvature and local surface orientation of said three dimensional surface model at positions having said biometric features.

3. The method of claim 1 further comprising the steps of:
    a) computing differences between said two dimensional minutiae and corresponding predefined reference values of a second object, and between said three dimensional minutiae and corresponding predefined reference values of said second object; and
    b) establishing identity of said object by comparing said differences with corresponding predefined thresholds.

4. The method of claim 1 further comprising the steps of:
    a) computing a plurality of parameters based on said two dimensional minutiae and corresponding pre-obtained reference values of a second object, and based on said three dimensional minutiae and corresponding pre-obtained reference values of said second object;
    b) generating matching scores based on said plurality of parameters; and
    c) establishing identity of said object based on said matching scores.

5. The method of claim 4, wherein said step of generating matching scores further comprises the steps of:
    a) generating a first matching score based on two dimensional coordinates and two dimensional orientations of said biometric features, and corresponding pre-obtained reference values of said second object;
    b) generating a second matching score based on three dimensional coordinates and three dimensional orientations of said biometric features, and corresponding pre-obtained reference values of said second object;
    c) generating a third matching score based on local surface orientations of said three dimensional surface model and corresponding pre-obtained reference values of said second object; and
    d) generating a fourth matching score based on surface curvature of said three dimensional surface model and corresponding pre-obtained reference values of said second object;
    wherein said step of establishing identity is based on: said first matching score; said second matching score; said third matching score; said forth matching score or any combination of above.

6. The method of claim 5, wherein said second matching score is a non-linear combination of difference between said three dimensional coordinates and corresponding pre-obtained reference values, and difference between said three dimensional orientations and corresponding pre-obtained reference values.

7. The method of claim 5, wherein said combination is a weighted sum of said first matching score, said second matching score, said third matching score and said fourth matching score.

8. The method of claim 5, wherein said combination is a dynamic combination of said first matching score, said second matching score, said third matching score and said fourth matching score.

9. The method of claim 1, wherein said biometric features are fingerprints and said object is a finger.

10. The method of claim 1, wherein said biometric features are palmprints and said object is a palm.

11. A biometric feature identification system comprising:
    a) a lighting module configured to produce a plurality of illuminations on an object having said biometric features;
    b) an image capturing means with fixed viewpoint configured to capture images of said object;
    c) a microprocessor coupled to said image capturing means and said lighting module; and
    d) a computer-readable storage medium coupled to said microprocessor; said computer-readable storage medium encoded with computer-readable instructions for causing said microprocessor to execute the following steps:
        i) synchronizing said image capturing means and said lighting module;
        ii) capturing a plurality of images of said object; each of said images having different illuminations;
        iii) reconstructing a three dimensional surface model of said object based on all of said plurality of images captured in said capturing step;
        iv) extracting a plurality of two dimensional minutiae of said biometric features from said plurality of images;
        v) evaluating a reliability of each of said two dimensional minutiae by determining a number of occurrence of each of said plurality of two dimensional minutiae throughout said plurality of images;

vi) extracting a plurality of three dimensional minutiae of said biometric features from said three dimensional surface model at positions of at least one reliable minutia, wherein said at least one reliable minutia is identified based on said reliability; and vii) establishing identity of said object based on said two dimensional minutiae and said three dimensional minutiae.

12. The biometric feature identification system of claim 11, wherein said two dimensional minutiae comprise two dimensional coordinates and two dimensional orientations of said biometric features; wherein said three dimensional minutiae comprise three dimensional coordinates of said biometric features; and surface curvature and local surface orientation of said three dimensional surface model at positions having said biometric features.

13. The biometric feature identification system of claim 11 further comprising a reference biometric feature database coupled with said microprocessor; wherein said computer-readable storage medium is further encoded with computer-readable instructions for causing said microprocessor to execute the following steps:

a) computing a plurality of parameters based on said two dimensional minutiae and corresponding reference values of a second object retrieved from said reference biometric feature database, and based on said three dimensional minutiae and corresponding reference values of said second object retrieved from said reference biometric feature database;

b) generating matching scores based on said plurality of parameters; and c) establishing identity of said object based on said matching scores.

14. The biometric feature identification system of claim 11; wherein said lighting module comprises a plurality of light sources positioned around said image capturing means and said computer-readable storage medium is further encoded with computer-readable instructions for switching on and off said plurality of light sources independently thereby illuminating said object from different illuminating angles.

15. The biometric feature identification system of claim 11; wherein said lighting module comprises a modulated light source and said computer-readable storage medium is further encoded with computer-readable instructions for alternating the output intensity of said modulated light source thereby producing different illuminations on said object.

16. The biometric feature identification system of claim 11; wherein said object has no physical contact with said biometric feature identification system.

17. The biometric feature identification system of claim 11, wherein said biometric features are fingerprints and said object is a finger.

18. The biometric feature identification system of claim 11, wherein said biometric features are palmprints and said object is a palm.

* * * * *